(12) United States Patent
Ricci et al.

(10) Patent No.: US 12,472,719 B2
(45) Date of Patent: Nov. 18, 2025

(54) MULTIPLE ROLLER EMBOSSER AND METHOD FOR SELECTING AN EMBOSSING ROLLER

(71) Applicant: Valmet Tissue Converting S.p.A., Lucca (IT)

(72) Inventors: Mauro Ricci, S. Pietro a Vico (IT); Fabrizio Lorenzi, Lucca (IT)

(73) Assignee: VALMET TISSUE CONVERTING S.P.A., Lucca (IT)

( * ) Notice: Subject to any disclaimer, the term of this patent is extended or adjusted under 35 U.S.C. 154(b) by 107 days.

(21) Appl. No.: 18/580,709

(22) PCT Filed: Jul. 19, 2022

(86) PCT No.: PCT/EP2022/070264
§ 371 (c)(1),
(2) Date: Jan. 19, 2024

(87) PCT Pub. No.: WO2023/001852
PCT Pub. Date: Jan. 26, 2023

(65) Prior Publication Data
US 2024/0367406 A1 Nov. 7, 2024

(30) Foreign Application Priority Data
Jul. 22, 2021 (IT) .................. 102021000019499

(51) Int. Cl.
*B31F 1/07* (2006.01)
(52) U.S. Cl.
CPC ........ *B31F 1/07* (2013.01); *B31F 2201/0753* (2013.01); *B31F 2201/0776* (2013.01)

(58) Field of Classification Search
CPC ...... B31F 2201/0776; B31F 2201/0753; B31F 1/07
See application file for complete search history.

(56) References Cited

U.S. PATENT DOCUMENTS

| 3,556,907 | A | 1/1971 | Nystrand |
| 6,746,558 | B2 | 6/2004 | Hoeft et al. |
| 10,220,591 | B2 | 3/2019 | Montagnani et al. |
| 2010/0000687 | A1* | 1/2010 | Gelli ................. B31F 1/07 156/553 |

(Continued)

FOREIGN PATENT DOCUMENTS

| EP | 1074382 A1 | 2/2001 |
| EP | 1075387 B1 | 11/2003 |
| EP | 1239079 B1 | 6/2007 |

(Continued)

*Primary Examiner* — Vishal I Patel
(74) *Attorney, Agent, or Firm* — BREINER & BREINER.L.L.C.

(57) ABSTRACT

The embosser includes two load-bearing structures that are mutually movable to approach and move away from each other. The first load-bearing structure supports a plurality of first embossing rollers that can be selectively brought to an operating position, in which they cooperate with a first pressure roller. The second load-bearing structure supports one or more second embossing rollers cooperating with a second pressure roller. The two support structures can be moved away from each other to allow the selection movement of the first embossing rollers.

15 Claims, 4 Drawing Sheets

(56) References Cited

U.S. PATENT DOCUMENTS

| | | | |
|---|---|---|---|
| 2013/0099417 A1* | 4/2013 | Ricci | B31F 1/07 264/293 |
| 2019/0111651 A1* | 4/2019 | Paolinelli | B31F 1/07 |

FOREIGN PATENT DOCUMENTS

| | | |
|---|---|---|
| EP | 1319748 B1 | 4/2008 |
| EP | 1855876 B1 | 2/2012 |
| GB | 2378421 A | 2/2003 |
| JP | 2013-184350 A | 9/2013 |
| WO | 2018/036793 A1 | 3/2018 |

* cited by examiner

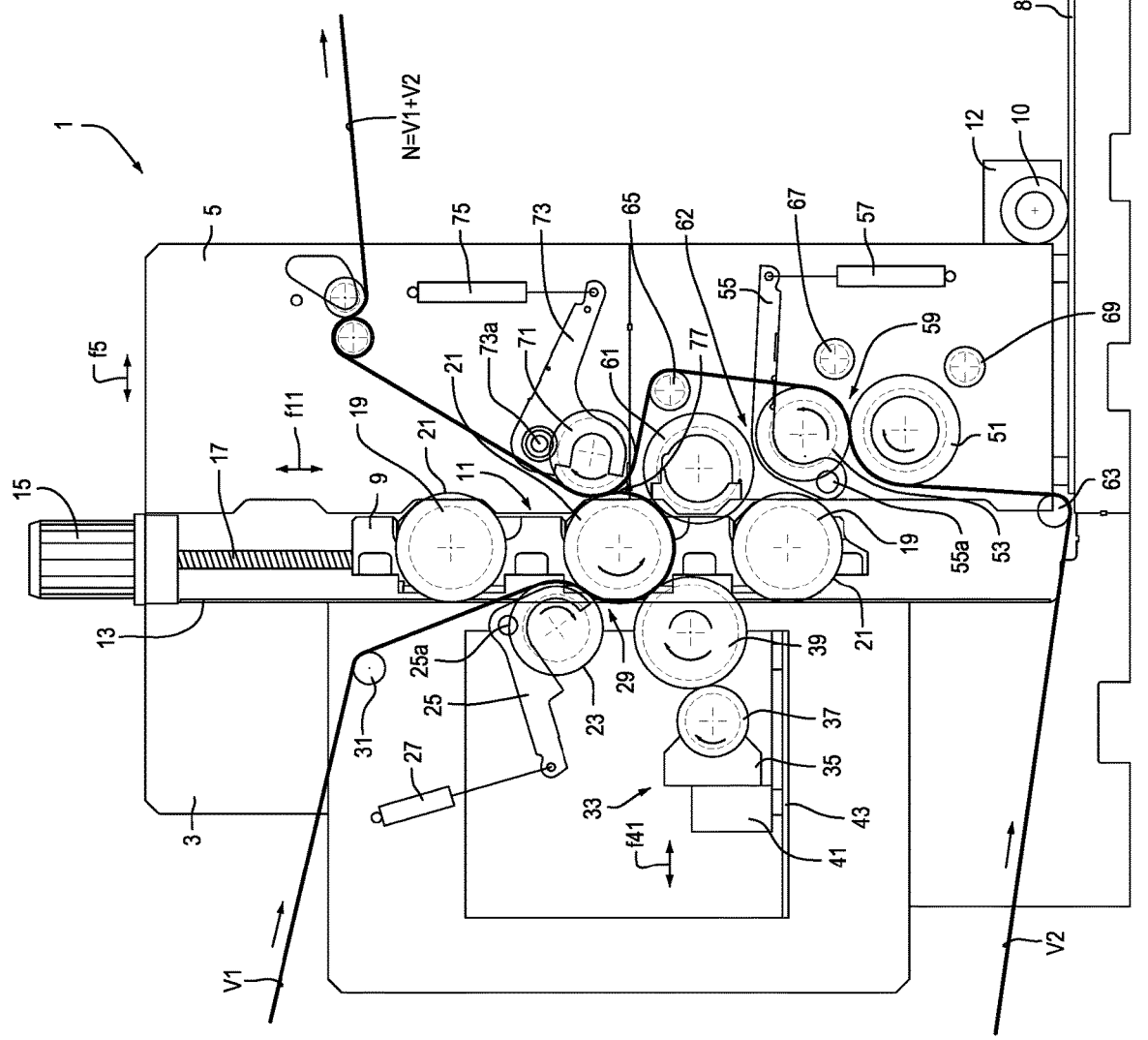
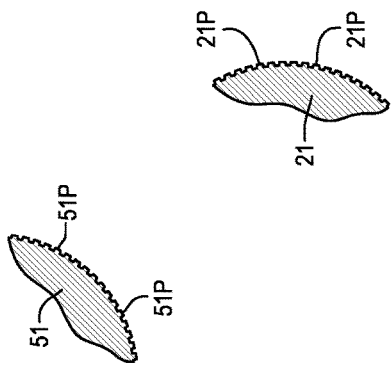
Fig.1
Fig.1A
Fig.1B

MULTIPLE ROLLER EMBOSSER AND METHOD FOR SELECTING AN EMBOSSING ROLLER

TECHNICAL FIELD

The present invention relates to the field of machines for processing or converting web material. Embodiments disclosed herein relate specifically to machines for processing or converting plies of cellulosic web material, such as particularly (but not exclusively) tissue paper. Specifically, improvements to so-called embossers are disclosed herein, i.e., machines for embossing continuous sheets, webs or plies, particularly of tissue paper, for example.

PRIOR ART

In the field of manufacturing and converting of so-called tissue paper, to produce products such as toilet rolls, kitchen towels, napkins and handkerchiefs, or the like, it is known to unwind a plurality of plies of web material, typically made of cellulosic fibers, from one or more parent reels, and to convert the plies into a semi-finished or finished product comprising two or more plies bonded to one another.

The bonding of cellulosic fiber plies for the production of a multi-ply web material is frequently done using an adhesive or by mechanical ply-bonding, i.e., bonding obtained by pressing one ply against the other under high pressure.

For this purpose, at least one of the plies of cellulosic fibers is embossed by means of an embossing roller and a pressure roller, typically coated with elastically yielding material. Through embossing, the cellulosic fiber ply is permanently deformed, forming embossed protrusions. While the cellulosic fiber web is still adhered to the embossing roller, an adhesive is applied to the embossed protrusions. Next, a second ply is superimposed on the embossed cellulosic fiber ply, and the two plies are pressed against each other at the areas that received the adhesive, to cause their mutual adhesion. Other plies can be added to the two aforementioned plies, such as interposed or overlapping each other.

Embossing, in addition to allowing the application of an adhesive in small areas, to achieve mutual adhesion of the plies of cellulosic material, also has the purpose of improving the quality of the multi-ply paper product. For example, it is possible to increase the thickness of each individual ply so as to achieve an increase in the volume or diameter of the finished product, in cases where the web material formed by the cellulosic plies is wound into rolls. In other cases, it is possible to increase the mechanical strength of the plies, that is, their resistance to a breaking load, or to increase their absorbency or softness.

Therefore, for these reasons, methods and machines have been developed for embossing plies of cellulosic material as disclosed in EP1075387, EP1855876, U.S. Pat. No. 3,556,907, EP1239079, EP1319748, U.S. Pat. No. 6,746,558. In general, machines of this type are called embossers, or sometimes embosser-laminators, because they perform the operations of embossing at least one ply and laminating two or more plies together.

It is useful to be able to replace one or more embossing rollers to change from one production order to another, such as by changing the embossing pattern of one or more plies of web material. The replacement of embossing rollers is typically done through the use of a bridge crane that picks up the roller that needs to be replaced from the embosser and replaces it with another embossing roller taken from a special embossing roller storage area.

EP1074382 discloses an embosser with interchangeable embossing rollers. In an embodiment described in this prior art document, a revolver system is provided which supports a plurality of embossing rollers, arranged in pairs. Rotating the revolver brings one or another of the pairs of embossing rollers into a working position, each of which cooperates with a respective pressure roller. In another embodiment, the pairs of embossing rollers are installed on movable equipment on a double 90° guide. The arrangement should allow one or the other of the movable equipment with their respective pairs of embossing rollers to be moved to the working position between two pressure rollers. In either case, it is only possible to replace the pair of working embossing rollers with a different pair of embossing rollers. The flexibility of the embosser designed in this way is very limited, in the face of considerable complexity of structure.

Recently, to simplify and speed up the replacement of embossing rollers, further increasing the flexibility of the embosser, embossers have been proposed which include magazines and embosser handling devices integrated into the embosser itself. An example of such an embosser is disclosed in U.S. Pat. No. 10,220,591. In this known embosser a load-bearing structure is provided, on which there are mounted a first embossing roller, a second embossing roller, a first pressure roller cooperating with the first embossing roller, and a second pressure roller cooperating with the second embossing roller. An adhesive dispenser cooperates with the first embossing roller. Associated with the embosser is a magazine of interchangeable embossing rollers, which can be used to replace one or the other of said first embossing roller and second embossing roller. A manipulator member is used to remove one or the other of said first and second embossing rollers from the load-bearing structure and replace it with one of the embossing rollers taken from the magazine. To perform the replacement of the embossing rollers, the adhesive dispenser is moved away from the first embossing roller.

An embosser-laminator assembly is disclosed in GB2378421 as comprising a first track on which first embossing rollers are slidingly mounted, which can be individually translated along the track by respective skids, to bring one of said first embossing rollers into working position. On a second track, three additional embossing rollers, which can also be individually translated along the second track via respective skids, are slidingly mounted to bring one of said second embossing rollers into the working position. The tracks of the first group and the second group of embossing rollers are placed at a fixed distance from each other. The machine summarily disclosed in this publication also includes two pressure rollers, which press on the two embossing rollers (first group and second group, respectively) selected to emboss two cellulosic plies. The machine also includes an adhesive applicator and a laminating roller. Publication GB2378421 does not describe any details of the load-bearing structure of the embossing rollers, pressure rollers, laminator roller, and adhesive applicator, and therefore does not provide any indication of how these components are movable relative to each other.

There is currently a continuous search toward increasingly improved and efficient embossing roller handling that, in addition to providing high versatility of operation, is easy to use, low cost, and space-saving.

SUMMARY

According to one aspect, an embosser is disclosed herein, comprising a first load-bearing structure, on which a plurality of first embossing rollers is supported, each having a respective rotation axis. The first embossing rollers are movable relative to the first load-bearing structure to selectively bring one or another of the first embossing rollers to an operating position. In addition, the embosser assembly includes a first pressure roller adapted to form a first embossing nip with the first embossing roller which is in an operating position. A first path passes through the first embossing nip for a first ply of web material. The embosser further comprises a second load-bearing structure, on which at least a second embossing roller is rotatably supported and on which a second pressure roller is further supported, adapted to define, with the second embossing roller, a second embossing nip. Through the second embossing nip, a second path for a second ply of web material may extend.

The first load-bearing structure and the second load-bearing structure are movable relative to each other to take a position of mutual approach and a position of mutual distancing. In the mutual distancing position, the first embossing rollers can be moved relative to the first load-bearing structure to bring selectively one or the other of the first embossing rollers into the working position. In general, "movable with respect to each other" means that the first load-bearing structure may be fixed and the second load-bearing structure may be movable; or, conversely, that the first load-bearing structure may be movable and the second load-bearing structure may be fixed; or that both the first load-bearing structure and the second load-bearing structure are movable.

By making the first load-bearing structure and the second load-bearing structure movable with respect to each other, it is possible to move the second embossing roller away from the first embossing rollers and thus make the selection movement of the first embossing rollers easier. In this way, it is possible to obtain a layout in which the first embossing roller in the operating position and the second embossing roller are very close to each other, for example to perform a so-called tip-to-tip embossing or a DESL (Double Embossing Single Lamination) embossing, which require in the first case mutual contact between the first and second embossing rollers, and in the second case a very limited distance between the first embossing roller and the second embossing roller. An example of a DESL embosser is described below with reference to the drawings.

The embosser makes it possible, with a simple and compact design, to bring one or the other of two or more first embossing rollers into working position, allowing simple and rapid adaptation of the embosser to different operating conditions, to produce different types of multi-ply web materials, which are distinguished by the type of embossing pattern on one or more of the plies that constitute it.

A particularly efficient embosser is obtained, if the first embossing rollers are rotatably mounted on a support which is movable relative to the first load-bearing structure. The movable support is provided with a selection movement with respect to the first load-bearing structure, to selectively arrange one or the other of said first embossing rollers supported on the movable support in an operating position. Using a common movable support for the first embossing rolls makes the selection movement easier and more efficient.

For example, the movable support may be provided with a translational movement, e.g., it may include a carriage or slide that can be translatable orthogonally to the rotation axes of the first embossing rollers.

In order to obtain an embosser of compact structure and small footprint, the first embossing rollers can advantageously be mounted on the movable support on top of each other, with their respective rotation axes lying on a preferably vertical plane. The movable support is provided with a movement parallel to said plane to selectively bring one or the other of the various first embossing rollers to work.

To facilitate the replacement of the first embossing roller, the first pressure roller is supported by the first load-bearing structure and is preferably movable, relative to the first load-bearing structure, between a non-operating position and an operating position, in the operating position the first pressure roller and the first embossing roller being pressed against each other.

In embodiments disclosed herein, the second pressure roller is supported by the second load-bearing structure and is preferably movable relative to the second load-bearing structure to approach or move away from the second embossing roller.

To increase the flexibility of the embosser, in advantageous embodiments, at least one additional second embossing roller is rotatably supported on the second load-bearing structure. In this way, one or the other of the first embossing rollers carried by the first load-bearing structure and one or the other of the second embossing rollers carried by the second load-bearing structure can be alternately selected.

In advantageous embodiments, the second embossing roller, the additional second embossing roller, and the second pressure roller are arranged in such a way that the second pressure roller can cooperate alternately with the second embossing roller and the additional second embossing roller, without the need to move the second embossing rollers relative to the second load-bearing structure. This can be achieved, for example, by mounting the second embossing roller on movable members, such as swing arms relative to the second load-bearing structure, and placing the second embossing roller in an intermediate position between the second embossing roller and the additional second embossing roller. In this way, the second pressure roller forms opposing embossing nips with the second embossing roller and the additional second embossing roller.

In some embodiments, the embosser further includes a functional fluid dispenser adapted to cooperate with the first embossing roller which is in the operating position to apply a functional fluid to a ply of web material guided around said first embossing roller. Preferably, the functional fluid dispenser is supported by the first load-bearing structure and is movable relative to the first load-bearing structure to approach and move away from the first embossing roller which is in the operating position.

BRIEF DESCRIPTION OF THE DRAWINGS

The invention will be better understood by following the description and the accompanying drawings, which illustrate an exemplary and non-limiting embodiment of the invention. More particularly, the drawings show:

FIG. 1 a schematic side view of an embodiment of an embosser in a possible working position;

FIGS. 1A and 1B enlarged schematic details of portions of a first embossing roller and a second embossing roller of the embosser of FIG. 1;

DETAILED DESCRIPTION

Figure 2:
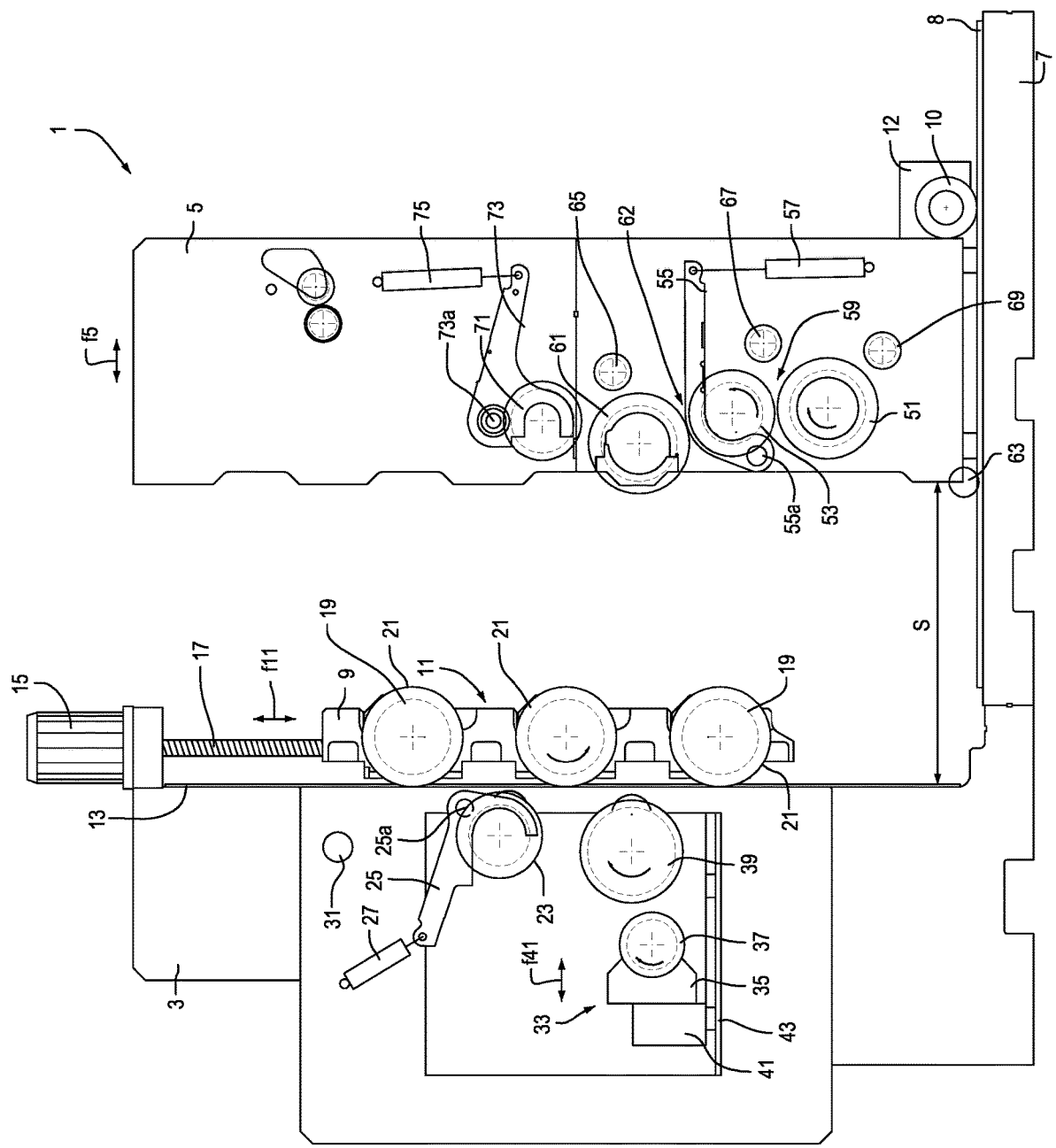
FIG. 2 a view similar to the view of FIG. 1 with the embosser in the non-working position.

FIG. 1 shows a schematic side view of an embodiment of an embosser in one of the several possible operating positions. The embosser, overall indicated with reference numeral 1, comprises a first load-bearing structure 3 and a second load-bearing structure 5, which are movable relative to each other in the manner described below. In the illustrated embodiment, the embosser 1 also has a base 7. In the embodiment shown in the accompanying drawings, the first load-bearing structure 3 is fixed relative to the base, which can be anchored to the ground, while the second supporting structure 5 is movable along the base according to the double arrow f5. The possibility of moving even or only the first load-bearing structure 3 is not excluded. However, the second load-bearing structure 5 is lighter and therefore it is easier to move the latter than the first load-bearing structure 3.

In the illustrated embodiment, a guide 8 is fixed on the base 7, which can comprise two tracks, one for each of the two sides that form the second load-bearing structure 5. The guide 8 can be associated with a rack with which a toothed wheel 10 meshes, driven by a motor 12, to control the movement according to f5, of reciprocal approaching and distancing between the second load-bearing structure 5 and the first load-bearing structure 3. In other embodiments, other types of actuators may be provided, for example one or more cylinder-piston actuators, or a fixed motor with a threaded rod which engages with a nut screw integral with the second load-bearing structure 5, or other mechanisms adapted to impart the motion according to the double arrow f5.

Figure 3:
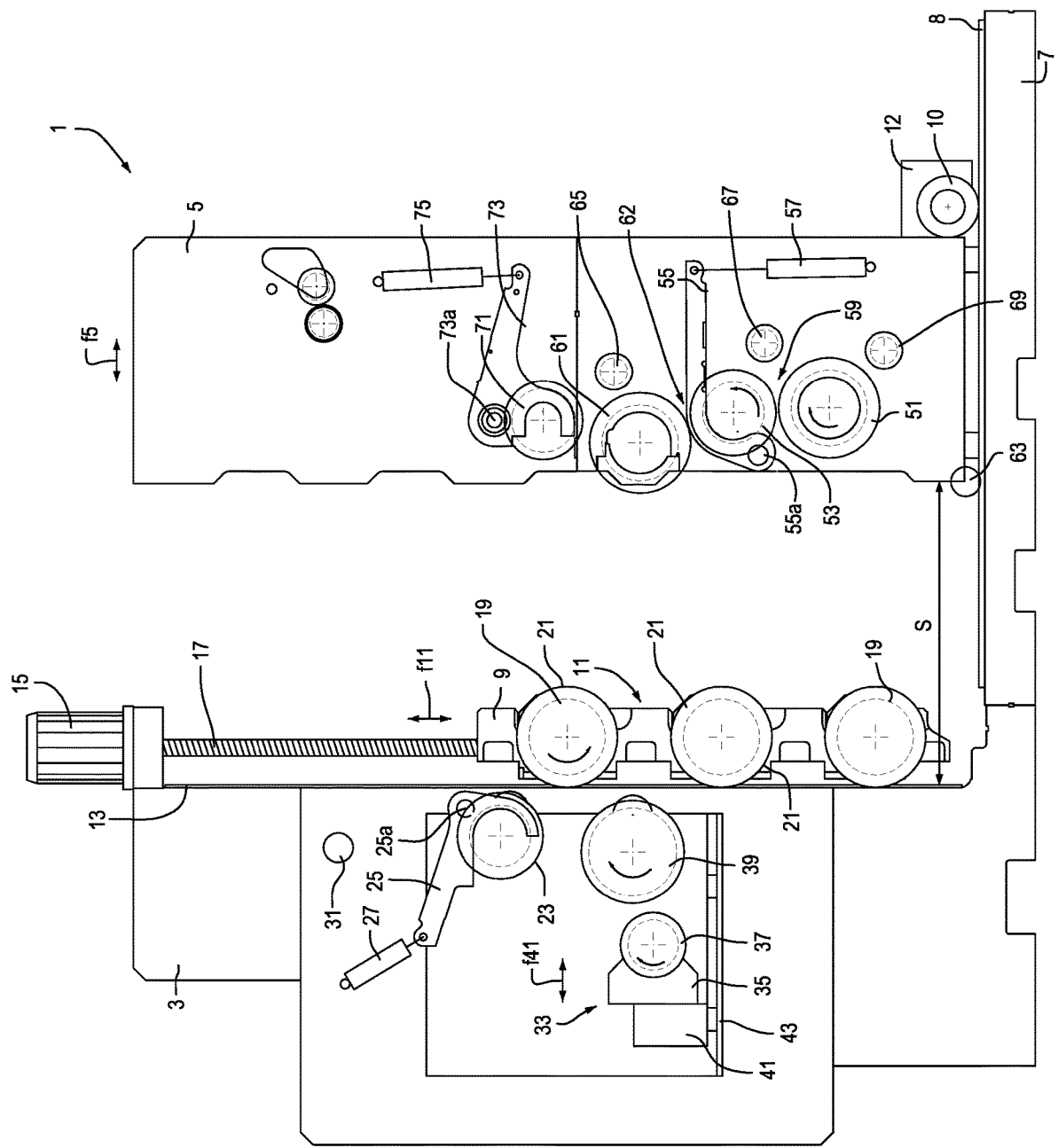
FIG. 3 a view similar to the view of FIG. 2, with a different position of the embossing rollers.

As visible in FIGS. 2 and 3, in the embodiment shown, the two supporting structures 3 and 5 can be spaced by forming a space S between them, the size of which can be such as to allow easy passage of an operator between the two load-bearing structures 3, 5, for the purpose of performing maintenance, repair or other operations, for instance.

In practice, each of the two load-bearing structures 3 and 5 comprises two vertical sidewalls aligned with each other orthogonally to the plane of the figures. Therefore, only one of the sidewalls of each load-bearing structure 3, 5 is visible in the drawings. The other sidewall is removed to show the members that are housed between the two sidewalls.

As will be described later, various embosser members, and in particular embossing rollers, pressure rollers, laminating rollers, guide rollers, dispensers of adhesive or other functional liquids, and the like, are arranged between the two sidewalls of each load-bearing structure 3, 5.

In other embodiments, the maximum distance between the two load-bearing structures 3, 5 can be less than that shown in the accompanying drawing.

A guide 13 is arranged on the first load-bearing structure 3, which may include two guide rails, one for each sidewall forming the first load-bearing structure 3. A carriage or slide 9 forming part of a movable support 11 is sliding along the guide 13. The movable support 11 has a lifting and lowering movement along the guide 13 according to the double arrow f11 (FIG. 2) for the purposes clarified below. The movement according to f11 can be controlled by a motor 15 or a pair of motors 15, one for each sidewall of the first load-bearing structure 3. The motion according to f11 is parallel to a vertical plane on which the rotation axes of first embossing rollers 21 lie, which are mounted overlapping each other on the movable support 11.

By way of example only, in the illustrated embodiment, motion is transmitted from the motor 15 to the movable support 11 via a threaded rod or a pair of threaded rods 17, one for each sidewall of the fixed structure 3. This does not exclude the possibility of other configurations of the actuator device to move the movable support 11 according to f11. For example, a motor may be arranged on the carriage 9 to drive a pinion, or a pair of pinions, each meshing with a rack, parallel to the respective guide 13, integral with a respective sidewall of the load-bearing structure 3, such that rotation of the motor causes the carriage or slide 9 of the movable support 11 to slide up or down.

A plurality of seats 19 is arranged on the movable support 11, each of which supports a respective embossing roller 21. Thus, a plurality of first embossing rollers 21 is supported on the movable support 11, and more specifically on the slide or carriage 9 Each embossing roller 21 has its own rotation axis around which it can rotate while being supported by the movable support 11.

By moving the carriage or slide 9 according to arrow f11, it is possible to selectively bring one or the other of the first embossing rollers 21 into a working position, also referred to in the following as an operating position. The first embossing rollers 21 can be placed in a space between two planes containing the two sidewalls of the first load-bearing structure 3.

Each first 21 embossing roller comprises a plurality of 21P embossing protuberances on its cylindrical surface, as schematically shown in the enlargement of FIG. 1A.

By way of example only, three first embossing rollers 21 are provided in the example shown. The number of first embossing rollers 21 may be different and will be at least two. The total number of first embossing rollers 21 may depend, for example, on the height of the first load-bearing structure 3, taking into account that the carriage or slide 9 must move along the structure first load-bearing in such a way that each of the first embossing rollers can be selectively arranged in the operating position.

In the operating condition of FIG. 1, the first central embossing roller 21 is in the working position, i.e., in the operating position, while the upper embossing roller 21 and the lower embossing roller 21 are in the non-operating position. The embossing roller 21, which is in the operating position, is interfaced with a motorization that brings it into rotation. The motorization, not shown, may include, for example, a motor on axis with the embossing roller 21 in the operating position, to which it is connected via a front coupling. In other embodiments, an off-axis motor may be provided with a belt or gear system, which transmits motion from the motor to the embossing roller 21 that is in the operating position.

A first pressure roller 23 is also arranged on the first load-bearing structure 3. The first pressure roller 23 is positioned between the two sidewalls of the first load-bearing structure 3.

The first pressure roller 23 is supported on the first load-bearing structure in such a way that it can move relative to the first embossing roller 21 that is in the operating position. For this purpose, in the illustrated embodiment, the first pressure roller 23 is supported by a pair of movable arms 25, e.g., hinged to the load-bearing structure 3 so as to swing around an oscillation axis 25a. The swinging motion of the first pressure roller 23 can be controlled by an actuator, such as a cylinder-piston 27 or a pair of cylinder-piston actuators, arranged on the two sidewalls of the first load-bearing structure 3. The first pressure roller 23 forms, with the first embossing roller 21 in operating position, a first embossing nip 29.

One or more guide rollers adapted to define a first path for a first ply of web material V1 are also supported on the first load-bearing structure 3. Specifically, a guide roller is indicated with 31. The first path for a first ply of web material V1 extends through the first embossing nip (29);

The first pressure roller 23 may have a cylindrical surface coated with a layer of elastically yielding material, such as natural or synthetic rubber, or other suitable material. Thus, pressing the pressure roller 23 against the cylindrical surface of the first embossing roller 21 in the operating position results in the embossing of the first ply of web material V1 passing through the first embossing nip 29, while the first embossing roller 21 in the operating position and the first pressure roller 23 rotate in opposite directions. The first pressure roller 23 may be provided with its own motor. In other currently preferred embodiments, the first pressure roller is drawn into rotation by pressure contact against the first embossing roller 21, which is in the operating position.

On the first load-bearing structure 3 is additionally mounted a functional fluid dispenser 33. The functional fluid may be, for example, glue, or water or any other liquid adapted to cause, favour or promote the mutual adhesion of several plies of web material fed to the embosser 1.

In the illustrated exemplary embodiment, the functional fluid dispenser 33 comprises a functional fluid tank 35, an screen roller, also called anilox roller 37, and a cliche roller 39. The screen roller 37 draws functional fluid from the tank 35 and transfers it to the cliche roller 39, which applies it to the first ply of web material V1 at embossing protuberances 1P of the first embossing roller 21 that is in the operating position.

The tank 35, the anilox roller 37 and the cliché roller 39 may be supported on a slide or carriage 41, moving according to the double arrow f41 along guides 43 integral with the first load-bearing structure 3. The movement according to f41 allows the cliche roller 39 to be moved closer to and further away from the embossing roller 21 that is in the operating position.

On the second load-bearing structure 5, and more precisely between the two sidewalls thereof, a second embossing roller 51 is rotatably supported. The second embossing roller 51 is provided with embossing protuberances 51P, as schematically shown in the enlargement of FIG. 1B. The second embossing roller 51 can be connected to a motorization that brings the second embossing roller 51 into rotation. In some embodiments, the same motorization can bring the first embossing roller 21 that is in the operating position and the second embossing roller 51 into rotation. For example, motion may be transmitted by a gear train, a system of belts and pulleys, or a combination thereof. In other embodiments, separate motors may be provided for the first embossing roller 21 and the second embossing roller 51.

A second pressure roller 53 supported by the second load-bearing structure 5 can cooperate with the second embossing roller 51. The second pressure roller 53 may be movable with respect to the second load-bearing structure 5. For this purpose, the second pressure roller 53 may be supported by movable arms 55, for example. The arms 55 may be pivoting arms pivoting around an oscillation axis 55a. The swinging motion of the arms 55 can be controlled by a cylinder-piston actuator 57 or a pair of cylinder-piston actuators 57.

The second pressure roller 53 may be provided with a cylindrical surface coated with elastically yielding material, e.g., natural or synthetic rubber, or other suitable material, to emboss a second ply of web material V2 fed along a second feeding path through an embossing nip formed between the second pressure roller 53 and a second embossing roller as further described below.

In the embodiment shown, the structure of the embosser 1 is such that the second path of the second ply V2 of web material can extend differently depending on the specific operating condition of the embosser 1, as described below. In the operating condition of FIG. 1, the second path of the second ply of web material V2 extends through a second embossing nip 59 defined between the second embossing roller 51 and the second pressure roller 53.

In the illustrated embodiment, in addition to the second embossing roller 51 an additional second embossing roller 61 is supported on the second load-bearing structure 5, which may define an additional second embossing nip 62 with the second pressure roller 53. The additional second embossing roller 61 may be provided with embossing protuberances similar to the embossing protuberances 21P and 51P of the first embossing rollers 21 and the second embossing roller 51.

Advantageously, according to the illustrated embodiment, the second pressure roller 53 is arranged in an intermediate position between the second embossing roller 51 and the further second embossing roller 61. In this way, as will become apparent from the following description, it is possible to selectively bring one or the other of the two embossing rollers 51, 61 to work by simply moving the second pressure roller 53, without the need to move the second embossing roller 51 and the additional second embossing roller 61.

To achieve high production flexibility, the various embossing rollers in embosser 1 have different embossing patterns, each defined by the arrangement of their respective embossing protuberances. Thus, by appropriately selecting the operating embossing rollers, different embossed products can be produced without disassembling and reassembling the embossing rollers.

In FIG. 1, the second ply of web material V2 passes along the second path through the second embossing nip 59 between the second pressure roller 53 and the second embossing roller 51.

Figure 4:
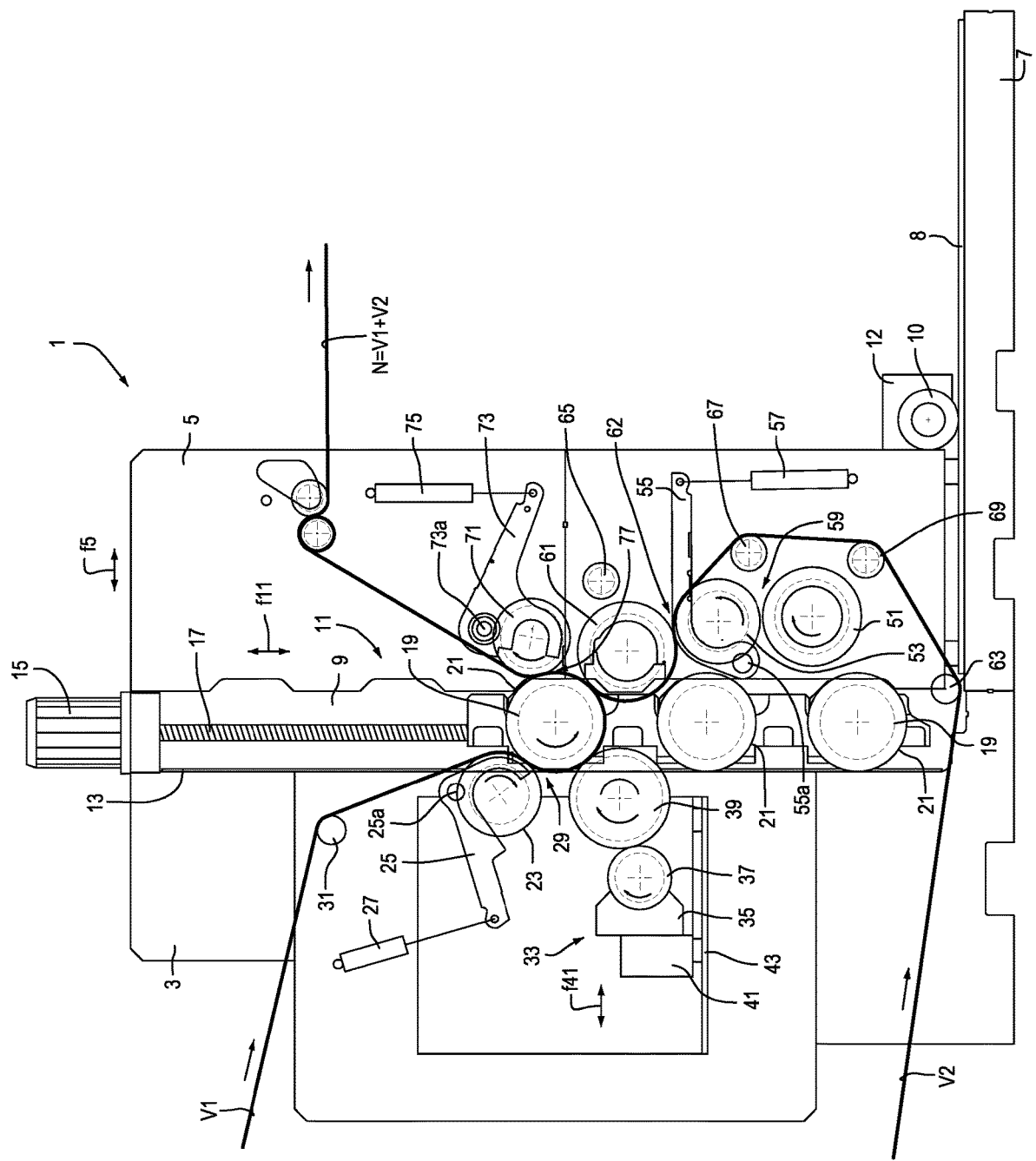
FIG. 4 a view similar to the view of FIG. 1, with a different position of the embossing rollers and paths of the plies of web material.

Conversely, in the operating condition of FIG. 4, the second ply of web material V2 passes through the additional second embossing nip 62, between the second pressure roller 53 and the additional second embossing roller 61.

In FIG. 1 the second pressure roller 53 is pressed by the actuator 57 against the second embossing roller 51, while in the condition of FIG. 4, the second pressure roller 53 is pressed by the actuator 57 against the additional second embossing roller 61.

To enable the feed path of the second ply of web material V2 to be changed, guide rollers indicated by 63, 65, 67 and 69 are supported on the second load-bearing structure. In the operating condition of FIG. 1, the feed path of the second ply of web material V2 is defined by guide rollers 63, 65, while in the operating condition of FIG. 4, the feed path of the second ply of web material V2 is defined by guide rollers 63, 69, 67.

With the system described so far, it is possible to emboss two plies of web material V1 and V2 and apply a functional liquid to ply V1. A laminating roller 71 can be provided, which can be carried by the second load-bearing structure 5, to bond the two plies of web material V1 and V2. The laminating roller 71 is advantageously movable with respect to the first embossing roller 21 which is in the operating position. For this purpose, in the illustrated embodiment, the laminating roller 71 is supported by arms 73 pivoting about an oscillation axis 73*a*. The motion is imparted by an actuator or pair of actuators 75. In the illustrated embodiment, the actuator which moves the arms 73 consists of a cylinder-piston actuator.

The laminating roller 71 can thus be pressed against the first embossing roller 21 which is in the operating position, thereby defining a laminating nip 77 therewith. The path of the first ply of web material V1 and the path of the second ply of web material V2 join in the lamination nip 77 so that the pressure exerted by the laminating roller 71 against the first embossing roller 21 in the operating position causes the plies of web material V1 and V2 to join, thus forming the embossed multi-ply web material N that exits the embosser 1.

In other embodiments, the laminating roller 71 can be omitted, or made inoperative, and the additional second embossing roller 61 can be pressed against the first embossing roller 21 that is in the operating position, such as by bringing the embossing protuberances of two embossing rollers to press against each other or at a distance less than the thickness of the web materials V1 and V2, to cause the plies of web materials V1 and V2 to adhere to each other, in an arrangement known in the art as "tip-to-tip."

As can be easily understood from the accompanying drawings and the above, the structure of embosser 1 allows for the selection of one or the other of first embossing rollers 21, bringing the desired one to the operating position, or working position. By way of example, in FIG. 1 the first embossing roller 21, which is in the intermediate position (i.e., center roller 21) is in working position. In FIG. 4 the topmost embossing roller 21 is in working position. Similarly, in the illustrated embodiment it is possible to select either one or the other of the second embossing rollers 51, 61. In FIG. 1 the second embossing roller 51 is in operation. In FIG. 4 the further second embossing roller 61 is in operation.

To change the operating condition of the embosser 1, for example, to change embossing roller 21 which is in the working position, it is sufficient to move the second load-bearing structure 5 away from the first load-bearing structure 3, as shown in the passage from FIG. 1 to FIG. 2. In addition, the functional liquid dispenser 33 is moved away from the embossing roller 21 that is in the working position, and the first pressure roller 23 and the laminating roller 71 can be moved away from the first embossing roller 21 that is temporarily in the working position. Once this condition has been reached (FIG. 2), it is possible to translate the movable support 11 to change the first embossing roller 21. In the example shown, moving from FIG. 2 to FIG. 3 the first embossing roller 21, which is in the highest seat on the movable support 11, is brought to the operating position by moving the movable support downward. The path of the first ply of web material V1 is also changed.

In the example shown, moving from the operating condition in FIG. 1 to the operating condition in FIG. 4, also the path of the second ply of web material V2 has been changed, so as to bring the embossing roller 61 to work in place of embossing roller 51. This modification requires the movement of the second pressure roller 53.

The embosser 1 is then brought back to work by bringing the first load-bearing structure 3 and the second load-bearing structure 5 closer together again.

Embodiment have been described herein and illustrated in the accompanying drawings for illustrative purposes. Those skilled in the art will understand that various modifications, omissions or additions may be contemplated with respect to what is specifically described herein, without departing from the scope of the invention as defined in the following claims.

For example, in the embodiment shown, it is provided that the second load-bearing structure 5 supports two second embossing rollers 51 and 61. This is particularly advantageous, because it greatly increases the possible working configurations of the embosser 1. In currently less preferred, but simpler and more cost-effective embodiments, only one second embossing roller may be provided.

As another example, it is possible to support the tank 35, the anilox roller 37, and the cliché roller 39 no longer on a movable structure along guides 43, but by means of a pivoting structure hinged to the load-bearing structure 3, the pivoting movement of which allows the cliche roller 39 to be moved closer to and further away from the embossing roller 21 that is in the operating position.

Additionally, when one of the first embossing rollers 21 is to be selected and thus the carriage or slide 9 is to be moved according to arrow f11, it is not necessary to distance the two load-bearing structures 3 and 5 to form a space S between them large enough for an operator to pass through, but it is possible to just move the two load-bearing structures 3 and 5 by a space S sufficient for moving the carriage or slide 9. On the other hand, it is possible to space the two load-bearing structures 3 and 5 by a space S even just to carry out maintenance without selecting one of the first embossing rollers 21.

The invention claimed is:

1. An embosser comprising:
   a first load-bearing structure, on which a plurality of first embossing rollers is supported, each first embossing roller of said first embossing rollers having a respective rotation axis, wherein the first embossing rollers are rotatably mounted on a movable support, the movable support being movable with respect to the first load-bearing structure; and wherein the movable support is provided with a selection movement with respect to the first load-bearing structure, to selectively arrange in an operating position one of said first embossing rollers mounted on the movable support;
   a first pressure roller adapted to form a first embossing nip with the one of the first embossing rollers which is in the operating position; wherein the first pressure roller is supported on the first load-bearing structure;
   a first path for a first ply of web material, said first path extending through the first embossing nip;
   a second load-bearing structure, on which at least a second embossing roller is rotatably supported;
   a second pressure roller adapted to form, with said at least a second embossing roller, a second embossing nip; wherein the second pressure roller is supported on the second load-bearing structure;
   a second path for a second ply of web material extending around the second pressure roller;
   wherein the first load-bearing structure and the second load-bearing structure are movable relative to each other to take a position of mutual approach and a position of mutual distancing; wherein the position of mutual distancing is such that the first embossing rollers can be moved relative to the first load-bearing structure to perform the selection movement of the movable support.

2. The embosser of claim 1, wherein the movable support includes a carriage translatable orthogonally to the respective rotation axis of each of the first embossing rollers along the first load-bearing structure.

3. The embosser of claim 1, wherein the first embossing rollers are mounted on the movable support overlapping each other, with each of the respective rotation axis of each of the first embossing rollers lying in a vertical plane, and in which the movable support is provided with a movement parallel to said plane.

4. The embosser of claim 1, wherein the first pressure roller is movable, relative to the first load-bearing structure, between a non-operating position and an operating position, to approach and move away from the one of the first embossing rollers in the operating position; and wherein in use, the first pressure roller and the one of the first embossing rollers in the operating position is pressed against each other.

5. The embosser of claim 1, wherein the second pressure roller is movable relative to the second load-bearing structure, to approach or move away from the at least a second embossing roller.

6. The embosser of claim 1, wherein on the second load-bearing structure, at least an additional second embossing roller is rotatably supported.

7. The embosser of claim 6, wherein the second pressure roller is movable to define the second embossing nip selectively with the at least a second embossing roller or with the at least an additional second embossing roller.

8. The embosser of claim 7, wherein the at least a second embossing roller, the at least an additional second embossing roller and the second pressure roller are arranged such that the second pressure roller cooperates with the at least a second embossing roller and the at least an additional second embossing roller, the second pressure roller being supported on movable members which pivot relative to the second load-bearing structure and being arranged between the at least a second embossing roller and the at least an additional second embossing roller.

9. The embosser of claim 8, wherein the second pressure roller is arranged in an intermediate position between the at least a second embossing roller and the at least an additional second embossing roller.

10. The embosser of claim 6, further comprising guide rollers arranged to define the second path of the second ply of web material such that said second path extends alternately around the at least a second embossing roller or the at least an additional second embossing roller.

11. The embosser of claim 1, wherein the first load-bearing structure and the second load-bearing structure are movable relative to each other in a direction orthogonal to rotation axes of the first embossing rollers.

12. The embosser of claim 1, wherein the first load-bearing structure is fixed to a base, and wherein the second load-bearing structure is movable along the base relative to the first load-bearing structure.

13. The embosser of claim 1, further comprising a functional fluid dispenser adapted to cooperate with the one of the first embossing rollers which is in the operating position, to apply a functional fluid to a ply of web material guided around the one of the first embossing rollers which is in the operating position; wherein the functional fluid dispenser is supported by the first load-bearing structure; and wherein the functional fluid dispenser is movable relative to the first load-bearing structure to approach and move away with respect to the one of the first embossing rollers which is in the operating position.

14. The embosser of claim 1, further comprising a laminating roller supported by the second load-bearing structure and adapted to cooperate with the one of the first embossing rollers which is in the operating position and defining with the one of the first embossing rollers which is in the operating position a laminating nip when the first load-bearing structure and the second load-bearing structure are in a position of mutual approach.

15. The embosser of claim 1, wherein in the position of mutual distancing, the first load-bearing structure and the second load-bearing structure form a space therebetween of sufficient width for an operator to pass through.

* * * * *